United States Patent Office 3,502,500
Patented Mar. 24, 1970

3,502,500
METHOD OF CURING AND COATING CONCRETE AND RESULTING PRODUCT
William S. Hoock, Flossmoor, Ill., assignor to Sinclair Research, Inc., New York, N.Y., a corporation of Delaware
No Drawing. Filed Nov. 1, 1965, Ser. No. 506,008
Int. Cl. C04b 41/30; B44d 1/02
U.S. Cl. 117—123                    12 Claims

ABSTRACT OF THE DISCLOSURE

The coating of freshly laid concrete to diminish loss of water due to evaporation and prevent spalling is disclosed. The coating is accomplished with a composition of a diene polymer having at least 1.8 predominantly primary, terminal, allylic hydroxyl groups per polymer molecule and a polyisocyanate curing agent. The diene has 4 to about 12 carbon atoms and the use of a solvent is optional.

---

This invention relates to a method of curing and coating concrete products. More particularly it relates to compositions which are useful as coatings for freshly placed Portland or other hydraulic cement concrete.

It is well-known in the construction trade that, in order to provide concrete structures with maximum strength characteristics, sufficient water must be present in the concrete mix to hydrate the silicate and aluminate compounds which make up the cement; either a deficiency or an excess of water in the mix will tend to weaken the finished structure. Therefore, formulations for making concrete normally include only the water required for hydration. It is necessary, then, that water loss during the curing process be kept at a minimum. If left uncovered freshly laid concrete will be reduced in water content due to the evaporation thereof at the surface.

Historically, coverings such as cotton or burlap mats, straw, paper, sawdust, canvas, polyethylene, petroleum resins, terpene resins, coumarone-indene resins, etc., have been used to reduce evaporation losses. Another approach frequently employed is to anticipate the evaporation loss by sprinkling, ponding or covering with wet earth. More recently, attempts have been made to employ linseed oil and silicone resins as moisture retaining coverings. The use of linseed oil for this purpose has proven unsatisfactory, however, due to the attack on the linseed oil of the alkaline material in the hydraulic cement in the nature of saponification of the acid and glyceride components of the oil and formation of soaps. The removal of the alkaline material is, of course, deleterious to the concrete in that it lessens the bonding of the calcareous materials. The other covering and wetting techniques all have various drawbacks including difficult or cumbersome application, only partial or area retention of the moisture in the concrete, expense of materials and, most significantly, failure to provide an efficient protective coating for the cured or "set" concrete.

The ideal covering, then, for freshly placed concrete would be one with good overall sealing and, therefore, water retention properties, which could be applied with relative ease, which would provide protection for the cured concrete, for instance against spalling (or "popping"), and which would be inexpensive. If a coating material could be applied which would consistently exhibit high water retention, the formulation of concrete mixes to provide maximum-strength cured materials could be more predictably undertaken with confidence in including just the proper amount of water therein.

A coating composition comprised of a film-forming, hydroxyl-containing polymer of a diethylenically unsaturated monomer and a polyisocyanate curing agent has been found to supply all of the above-mentioned needs for an effective concrete coating. The application of such a coating to the surface of a freshly laid hydraulic cement concrete has been found to substantially reduce water loss during the early hardening period, thus increasing cured strength, and to provide excellent protection against spalling of the cured concrete.

In accordance with the present invention the contemplated film-forming polymer is a diene polyhydroxy polymer having at least about 1.8 predominantly primary, allylic, terminal, i.e., attached to a terminal carbon atom, hydroxyl groups per polymer molecule on the average. Most advantageously, the polymer has at least 2.1 average terminal hydroxyl groups to, say, 2.6 or even 3 or more. Also, two terminal hydroxyls are generally separated by a long carbon-carbon chain. The polydiene may have a viscosity at 30° C. of about 5–20,000 poises, preferably about 15 to 5000 poises. Often the polymer, when a homopolymer, is obtained in a viscosity range of about 20 to 300 or 500 poises at 30° C. Preferred homopolymers have a viscosity of about 35 to 260 poises at 30° C. Thus, the film-forming polymers are essentially liquids, including semi-solids flowable under moderate pressure, at ambient temperatures or at temperatures in the range of −100° F. to 400° F., which enables them to be readily mixed with curing agents, pigments and solvents and easily applied to the surface of the concrete. The hydroxyl-containing diene polymers used in the present invention will have number average molecular weights in the range of about 200 to about 25,000 as determined by cryoscopic, ebullioscopic or osmometric methods. The preferred hydroxyl-containing diene homopolymers and copolymers will be in the molecular weight range of about 900 to 10,000. In contrast, conventional diene polymers such as GR-S rubber are extremely high in molecular weight, e.g., in the range of several hundred thousand and are, therefore, rubberlike materials which are not contemplated as the film-forming polymer in the preparation of the coating compositions of the present invention. The latter diene polymers are too high in molecular weight to be worked at ambient temperatures and contain no reactive hydroxyl groups. The diene polymers which are used in this invention have primary hydroxyl groups which are allylic in configuration, thereby being more reactive with the polyisocyanate curing agent.

The dienes which are employed to make the polymers are unsubstituted, 2-substituted or 2,3-disubstituted 1,3-dienes of up to about 12 carbon atoms. The diene preferably has up to 6 carbon atoms and the substituents in the 2- and/or 3-position may be hydrogen, alkyl, generally lower alkyl, e.g., of 1–4 carbon atoms, aryl (substituted or unsubstituted), halogen, nitro, nitrile, etc. Typical dienes which may be employed are 1,3-butadiene, isoprene, chloroprene, 2-cyano-1, 3-butadiene, 2,3-dimethyl-1, 3-butadiene, etc. The choice of diene will usually depend upon properties desired in the coating composition or in the cured coating; for example, chloroprene may be used, alone or in admixture with other dienes to produce oil-resistant and flame-proof coatings. The number and location of the hydroxyl groups and the molecular weight of the liquid polymer are for the most part a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100–200° C., preferably about 100–150° C.

The reaction preferably takes place in a mutual solvent system; that is, one which dissolves both the diene monomer and the hydrogen peroxide. Suitable solvents are isopropanol, acetone, methanol, sec-butanol, n-butanol, n-propanol and like alcohols having 2 to about 12 carbon atoms. The $H_2O_2$-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequate rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus, for example, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1% to 10% of the reaction mixture to assure a low molecular weight addition polymer product having more than about two hydroxyl groups per molecule.

The usable liquid (including semi-solid, etc.) polymers of butadiene, for instance, will preferably conform to the following simplified chemical structure:

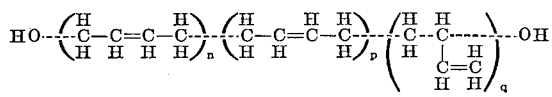

in which $n$ plus $p$ is greater than $q$, that is, the in-chain unsaturation accounts for more than 50% of the unsaturation. One or more of the H atoms appearing in the above formula will be replaced b yhydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may represent a number sufficient to give a cis-1, 4-unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g., about 50–65 percent and about 15–25 percent cis-1, 4-units, with about 15–25 percent 1,2-units. Branching may also occur in the above polymers, especially those prepared at higher temperatures. It should be emphasized, however, that the present invention is not necessarily limited to the use of hydroxyl-containing polydiolefins having the predominating trans-1,4-structure, although such are highly preferred, where otherwise suitable polymers having high cis-1,4-forms are available.

Olefinically unsaturated monomers may be incorporated into the diene polymers used in this invention and these may often be components which provide cross-linking sites. Usable monomers include alpha-mono olefinic materials of about 2 or 3 to 10 or 12 carbon atoms such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene copolymers which have sites suitable for cross-linking. As can be seen, the usable olefinic monomers may be ethylenes, substituted with halogen, aromatic hydrocarbon, or even cyano or carboxyl-containing radicals in some instances. The choice and amount of mono olefinic monomer employed will often be determined on the basis of properties desired in the final coating and is generally a minor proportion of the total monomers, most often not greater than about 40% by weight of the total monomers.

In addition to the homopolymers and copolymers comprised of single dienes and single monoolefinic monomers, the present invention may also use polymers made from combinations of a plurality of dienes and monoolefinic monomers. For example, mixtures of butadiene, isoprene and styrene can be polymerized to afford low molecular weight hydroxyl-containing polymers. Various combinations of dienes and monoolefinic monomers may be copolymerized to produce hydroxyl-containing copolymers or interpolymers which may be used as the film-forming ingredients of the coating compositions. Also, the polymer materials used in this invention may be given improved oxidation and ozone resistance by hydrogenating the hydroxyl-containing diene homopolymers and/or interpolymers to their corresponding more-saturated derivatives. Usually, the hydroxyl-containing diene homopolymers and copolymers used in the present invention will at most be only partially hydrogenated, so as to provide a material which is more stable due to diminished unsaturation but which still has good film-forming properties.

The curing agents which may be employed in the coating compositions of this invention include compounds containing two or more isocyanate radicals per molecule. The polyisocyanate is often used in an amount sufficient to supply about 0.1 to 10 isocyanate groups per OH group of the diene polymer, preferably about 0.5 to 3 isocyanate groups are supplied for each diene polymer hydroxyl. The proportions usually approach one mole of isocyanate curing agent per mole of polydiene, although either of the two materials may be provided in some excess. When simple diisocyanates are used, it is preferred to employ about 3 to 20%, say about 4–10% diisocyanate by weight of the diene polymer. The particular polyisocyanate to be used is selected in accordance with the properties desired in the coating composition or in the final cured coating. The preferred isocyanate curing agents for the present invention are aliphatic and aromatic diisocyanates such as 2,4-tolylene diisocyanate, metaphenylene diisocyanate, 2,6-tolylene diisocyanate (or mixtures of these materials), transvinylene diisocyanate, p,p'-diphenylmethane diisocyanate, and hexamethylene diisocyanate, as well as related aromatic and aliphatic isocyanates, which may also be substituted with other organic or inorganic groups that do not adversely affect the course of the curing reaction. These diisocyanates react with the diene polymers at ambient temperatures to form urethane linkages, apparently due to the increased reactivity given the hydroxyl groups by the allylic configuration.

In addition to the simple isocyanates described above, the hydroxyl-containing diene polymers can be cured with isocyanate-terminated polyethers or polyesters, etc., which are generally produced by reacting the isocyanate with, for example, polyglycols (such as polypropylene glycol) and polyesters (such as polyethylene adipate). These materials may be reacted with an excess of a diisocyanate. An example of such a material is the product obtained by the reaction of one mole of propylene glycol with 2 moles of 2,4-tolylene diisocyanate as shown below:

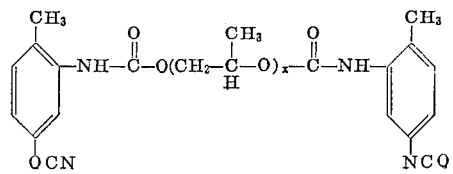

isocyanate-terminated polyether polyisocyanates such as the materials sold commercially as PAPI (polyarylene polyisocyanate) of the following structure:

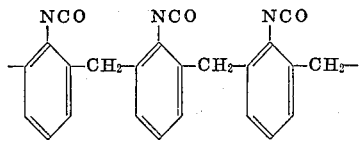

can also be employed.

In addition to the film-forming component and the curing agent, the coating compositions may further include an organic solvent. Any solvent in which the diene polymer and curing agent are miscible or suspendible to form a composition of low viscosity and which is unreactive with respect to the polymer or curing agent may be employed. Suitable solvents include, for example, hydrocarbons such as benzene, toluene, xylene, solvent naphtha, mineral spirits, etc., and ketones or other oxygen-containing materials. Mineral spirits boiling from about 250 to 450° F. have been found to perform exceptionally well in the coatings of the present invention and may have a sufficiently high flash point to render them relatively safe as regards flammability.

The amount of solvent in the coating composition, although not critical, should be enough to enable its application, for example, by spraying or brushing, to be uniform and economical.

According to the process of this invention, the coating composition is applied to the surface of the concrete as soon after it has been laid as is practical and before the concrete has completely cured, that is, preferably as soon as the surface is dry enough to support, rather than substantially absorb, the coating material. The time required for the freshly laid concrete to dry sufficiently to be coated will, of course, vary with the conditions of temperature and humidity, but will probably be within 12 hours after pouring. The amount of water lost during this surface drying preferably should not be more than about 10 percent by weight of the water in the concrete mixture, and even more preferably no more than 5 weight percent.

In order to test and compare the compositions of the present invention with prior art formulation used for the same purpose, the following procedure was employed:

Concrete specimens were prepared in accordance with the method described by ASTM C-156-55T with these exceptions:

The molds measured 8" x 8" x 2" rather than the 6" x 12" x 2" specified; a bacteriological incubator was used rather than an oven; bank sand was substituted for Ottawa sand; sand/cement ratios were estimated; and a watch glass was used to correct for volatile matter in the coating compositions.

Five test specimens were molded. One was untreated and used as a reference bogey, two others were treated with commercially available materials used for this purpose, and two were coated with formulations containing the polydiene film-former of the present invention, one of which included a polyisocyanate curing agent. Test results are listed in the table.

The test consisted of filling a mold with freshly mixed concrete, finishing the surface of the specimen in the prescribed manner and placing it in a curing cabinet to evaporate surface water. The specimen was then removed from the cabinet, the surface roughened, and the edges between the concrete and mold sealed with wax. The coating composition was sprayed or brushed evenly on the surface and the specimen returned to the curing cabinet for 72 hours. The ASTM specifications give the amount of applied coating composition to be a maximum of one gallon per 200 square feet or about 8 grams per 8" x 8" mold. Coatings must dry to the touch within

TABLE

| | Specimen No. | | | | |
|---|---|---|---|---|---|
| | 1 | 2 | 3 | 4 | 5 |
| | Coating composition | | | | |
| | None | Silicone | 50% R15 in toluene | 50% R15 with 6% TDI in toluene | Linseed oil |
| Weight of specimen, gms | 3,559 | 3,545 | 3,546 | 3,626 | 3,573 |
| Wt. of specimen and coating composition, gms | | 3,553 | 3,562 | 3,644 | 3,581 |
| Weight of coating uncorrected,[1] gms | | 8 | 16 | 18 | 8 |
| Weight of coating, gms | | 4 | 8 | 9 | 8 |
| Total weight loss after 3 hours, gms | 26 | 17 | 8 | [2] 16 | [2] 72 |
| Total weight loss after 24 hours, gms | 141 | 101 | 15 | 19 | 89 |
| Total weight loss after 48 hours, gms | 164 | 138 | 18 | 26 | 120 |
| Total weight loss after 72 hours, gms | 175 | 153 | 22 | 33 | 140 |
| Corrected Grams water loss/sq. cm | 0.423 | 0.361 | 0.034 | 0.058 | 0.320 |
| Reduction in water evaporation,[3] percent | | 15 | 92 | 86 | 20 |
| Water/cement, weight ratio | 0.6 | 0.6 | 0.6 | 0.6 | 0.6 |

[1] Uncorrected for volatile solvent applied with film-forming material.
[2] 16 hours curing.
[3] Compared to untreated sample.

As indicated in the table, Specimen No. 1 was not treated with a coating composition and served as a basis for comparison.

R-15 (Specimens 3 and 4) is used to designate a homopolymer of butadiene having an average of 2.6 predominantly primary, terminal, hydroxyl groups per polymer molecule, prepared by hydrogen peroxide catalyzed polymerization, and having the following properties:

Viscosity, poises at 30° C. _____ 200
Hydroxyl value, meq./g. _____ 0.80
Hydroxyl number, KOH mg./g. _____ 45
Molecular weight, average _____ 3000-3500
Moisture, weight percent _____ 0.05
Iodine number _____ 395
Density, lbs./gal. _____ 7.5
Monomer configuration:

Trans-1,4 _____ percent __ 60
    Cis-1,4 _____ do ___ 20
    Cis-1,2 _____ do ___ 20

The tolylene diisocyanate used was a commercial mixture of 80% 2,4-TDI and 20% 2,6-TDI.

The mineral spirits was a commercially supplied hydrocarbon solvent having the following physical properties:

Gravity, API° _____ 30.8
IBP, ° F. _____ 354
    10% _____ 364
    50% _____ 372
    90% _____ 382
    E.P. _____ 396
Flash point, ° F. _____ 140

The silicone composition was a commercially supplied coating material advertised and sold as an anti-spalling agent for concrete. Analysis showed it to be a 50–50 blend of a resinous material melting above 300° C. and a solvent boiling at about 245° F.

The linseed oil was a commercially supplied unemulsified oil.

A perusal of the table will reveal that in all the coated specimens some reduction of evaporation loss was observed; however, the percent reduction witnessed in those treated with the film-forming polymer of the present invention (Specimens 3 and 4) was substantially greater than either of the commercially supplied compositions tested, i.e., the silicone and the linseed oil. The amount of water lost, per square centimeter of surface area, was 0.034 and 0.058 for Specimens No. 3 and 4, respectively. ASTM C309–58 requirements are that no more than 0.055 gms./sq. cm. of water be lost through surface evaporation. The commercial coatings fell far short of satisfying the ASTM requirements, whereas Specimen No. 3 was well within the limit and Specimen No. 4 exceeded the limit by a negligible margin. Specimen No. 3, however, wherein the polyisocyanate curing aid was absent, failed to dry to a hard film within the four hours specified by ASTM requirements; the coating was tacky at the end of this period, as compared to the coating of the present invention (Specimen No. 4) which was hard and dry to the touch.

The results of further tests not recorded in the table, indicated that a reduction in the amount of diene polymer in the coating composition resulted in a corresponding reduction in the amount of moisture retained in the concrete.

Accelerated spalling tests were run on the above specimens subsequent to their being completely cured. The tests consisted of flooding the surfaces with water and storing in a freezer at 0° F. overnight. Each day the frozen specimens in their molds were removed from the freezer and sprinkled with salt to melt the ice. After eight hours the salt solution was replaced with fresh water and the flooded specimen again frozen. This cycle was repeated daily. After one week there was noted that the surfaces of all the specimens, with the exception of Specimen No. 4, softened and scuffed easily. The cycles were continued for a total of ten days, at the end of which no deterioration could be seen in Specimen No. 4.

In addition to the film-forming material and curing agent, there may be included in the coating compositions of the present invention various plasticizers, wetting agents, pigments, dyes, mold release agents, etc. The use of anionic and non-ionic soluble oils in the coating compositions of the present invention, for instance, provided films with excellent water retention as well as good mold release properties when applied to the surfaces of the forms prior to pouring the concrete.

It is claimed:

1. A method of coating concrete which comprises coating the surface of freshly laid concrete with a coating composition consisting essentially of a film-forming, hydroxyl-containing diene polymer having an average of at least 1.8 predominantly primary, terminal, allylic hydroxyl groups per polymer molecule, said diene being a hydrocarbon of 4 to about 12 carbon atoms, said polymer having a viscosity at 30° C. of about 5 to 20,000 poises and a number average molecular weight of about 200 to 25,000, and a polyisocyanate curing agent, said curing agent being present in the composition in an amount sufficient to provide about 0.1 to 10 isocyanate groups per hydroxyl group of the diene polymer and allowing said coating to cure, said coating being applied in an amount sufficient to retard water loss from the concrete.

2. The method of claim 1 wherein the diene is butadiene.

3. The method of claim 2 wherein the polyisocyanate curing agent is tolylene diisocyanate.

4. A concrete product coated according to the method of claim 1.

5. A concrete product coated according to the method of claim 2.

6. A concrete product coated according to the method of claim 3.

7. The method of claim 1 wherein the coating composition contains viscosity-reducing amounts of an organic solvent.

8. The method of claim 7 wherein the organic solvent is mineral spirits boiling from about 250 to 450° F.

9. A method of coating concrete which comprises coating the surface of freshly laid concrete with a coating composition consisting essentially of a film-forming, hydroxy-containing diene polymer having an average of 2.1 to 3 predominantly primary, terminal, allylic hydroxyl groups per polymer molecule, said diene being a hydrocarbon of 4 to about 6 carbon atoms, said polymer having a viscosity at 30° C. of about 15 to 5,000 poises and a number average molecular weight of about 900 to 10,000, and a diisocyanate curing agent, said curing agent being present in the composition in an amount sufficient to provide about 0.5 to 3 isocyanate groups per hydroxyl group of the diene polymer and allowing said coating to cure, said coating being applied in an amount sufficient to retard water loss from the concrete, and said coating being applied before more than about 10 weight percent of the water in the concrete has been lost.

10. The method of claim 9 wherein the diene is butadiene.

11. The method of claim 10 wherein the diisocyanate curing agent is tolylene diisocyanate.

12. A concrete product coated according to the method of claim 11.

References Cited

UNITED STATES PATENTS 2,000,759   5/1935   Johnson.
2,888,422   5/1959   Johnson et al.
2,963,765   12/1960  Tillman _____ 264—79

ALFRED L. LEAVITT, Primary Examiner

W. F. CYRON, Assistant Examiner

U.S. Cl. X.R.
264—79

UNITED STATES PATENT OFFICE
CERTIFICATE OF CORRECTION

Patent No. 3,502,500          Dated March 24, 1970

Inventor(s) William S. Hoock

It is certified that error appears in the above-identified patent and that said Letters Patent are hereby corrected as shown below:

Column 5, between lines 45 and 46, insert --ceptionally well in the coatings of the present invention--.

Column 6, delete line 22 completely beginning with "ceptionally" and insert therefor --four hours--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents

FORM PO-1050 (10-69)